Dec. 6, 1955   C. R. JACOBI ET AL   2,726,114
ANTI-GLARE ATTACHMENTS FOR VEHICLE WINDSHIELDS
Filed Dec. 22, 1952
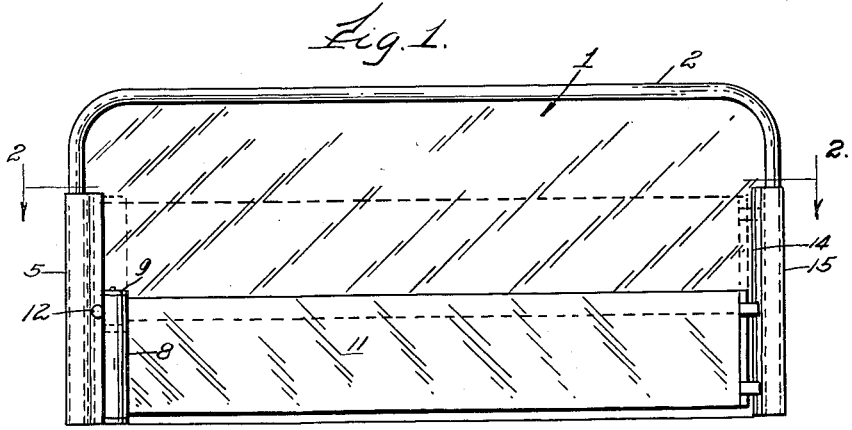
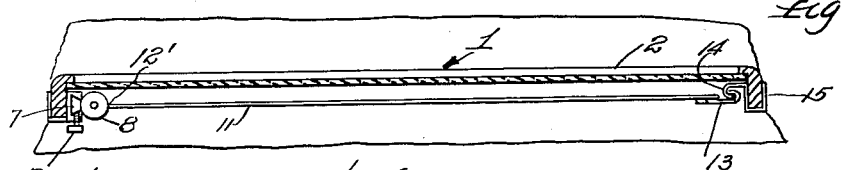
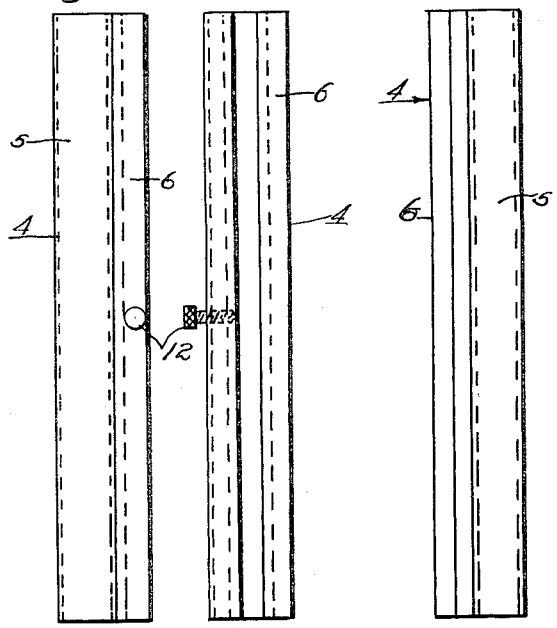
INVENTORS,
Charles R. Jacobi
Oscar C. Nord
Reginald P. Trubey
by H. J. Sanders
Attorney.

United States Patent Office 2,726,114
Patented Dec. 6, 1955

2,726,114

ANTI-GLARE ATTACHMENTS FOR VEHICLE WINDSHIELDS

Charles R. Jacobi and Oscar C. Nord, Grand Forks, N. Dak., and Reginald P. Trubey, San Antonio, Tex.

Application December 22, 1952, Serial No. 327,298

1 Claim. (Cl. 296—97)

This invention relates to windshield attachments and more particularly to an anti-glare attachment for vehicle windshields. One object is to provide a device that will effectively prevent sun glare from striking the eyes and reflected sun rays from the hood or dash of the vehicle from interfering with the vision of the driver and others in the front seat of the vehicle.

A further object is to provide an anti-glare device for adjustable attachment to the frame of the windshield that is adjustable vertically so that when the sun is near the horizon the parties concerned may look through the device and/or beneath same, the light rays being filtered out or toned down by the device, although under normal conditions the parties would look over the top of the device.

A further object is to provide an anti-glare device that is readily rolled into inoperative out-of-the-way position when not in use, that extends horizontally entirely across the windshield in use, that is adjustable as a unit vertically of its supports for selective vision, that is of simple construction, that may be readily assembled, applied or dismantled, that is inexpensive to manufacture, neat and attractive in appearance and durable in use.

With the foregoing and numerous other objects and advantages in view as will appear as the description proceeds, the invention resides in certain novel features of construction, and in the combination and arrangement of parts as will be hereinafter more fully described, illustrated in the drawings and defined in the claim.

In the drawing:

Fig. 1 is a front elevational view of the anti-glare device applied to a windshield, a normal position of the device being shown in full lines and an altered position in broken lines.

Fig. 2 is a horizontal cross-sectional view taken substantially on the line 2—2 of Fig. 1.

Fig. 3 is an end view, enlarged, of a support employed.

Figs. 4 and 5 are front and side views respectively of a support employed.

Fig. 6 is an end view of a clip rail.

Fig. 7 is an elevational view of Fig. 6.

Fig. 8 is an end view partly in section, of Fig. 9, taken on the line 8—8.

Fig. 9 is an elevational view, partly in section, of the anti-glare device, and

Fig. 10 is a bottom plan view of Fig. 9.

The reference numeral 1 denotes a windshield of an automobile and 2 the moulding. Fixedly but removably secured to one side of the moulding 2 is the vertically disposed grooved track 4 having a body portion 5 formed of resilient material substantially U-shaped in cross section, said body track portion 5 snugly receiving and positively embracing the moulding immediately inwardly from the windshield glass as clearly shown in Fig. 1.

Extending longitudinally of said body 5 and integral with or welded to one side thereof and co-extensive therewith is the mortised treadway 6 that snugly but adjustably receives the tenon 7 of the shade cylinder 8 that houses a shade roller 9 provided conventionally with the spring 10 placing the shade 11 under spring tension, the tenon 7 releasably secured in adjusted position in said mortised treadway by a screw 12 operatively carried by treadway 6, said shade extending outwardly conventionally through a slot 12a in the cylinder 8.

Fixedly secured, as by tiny rivets, to the free end of the shade 11 are the hooks 13 releasably secured to the curved lip 14 integral with the auxiliary track 15, U-shape, adjustably secured to the second side of the moulding 2. When the device is in use the shade 11 extends across the lower end of the windshield 1 and across the upper edge of the dash. If it is desired to raise the device the operator releases the screw 12 slightly and manually raises the cylinder 8 and hooks 13, along lip 14, with the shade 11 to the elevation desired whereupon the screw 12 is again tightened. When not in use the hooks 13 are disengaged from the lip 14 to permit the spring 10 to roll the shade upon its roller.

What is claimed is:

The combination with a vehicle windshield having a moulding, of an attachment including a grooved track having a body portion of resilient material U-shaped in cross section, said body portion snugly receiving and positively embracing said moulding immediately adjacent the windshield glass and extending from the base of the windshield more than half way to the top thereof, a mortised treadway extending longitudinally of said body portion at one side thereof and substantially co-extensive therewith, an adjustable slotted shade cylinder contiguous to said grooved track movable longitudinally thereof, a tenon carried by said shade cylinder disposed in said treadway, a spring-tensioned shade in said cylinder, said shade in one position extending across the lower end of the windshield and across the upper edge of the dash, hooks at one end of said shade, an auxiliary track adjustably secured to the side of said windshield opposite to said grooved track, a lip carried by said auxiliary track for releasable engagement with said hooks, said shade when said hooks are engaged with said lip extending transversely of the windshield and in one position of said grooved track and of said auxiliary track disposed above and in the line of vision of an occupant of the front seat of the vehicle, and in an altered position in the line of and slightly below such line of vision, and means for releasably retaining said shade cylinder in adjusted position.

References Cited in the file of this patent

UNITED STATES PATENTS

| | | |
|---|---|---|
| 58,885 | Raitt | Oct. 16, 1866 |
| 1,333,516 | Thomsen | Mar. 9, 1920 |
| 1,363,321 | Jaeger | Dec. 28, 1920 |
| 1,427,038 | Toadvine | Aug. 22, 1922 |
| 1,932,475 | Peteler | Oct. 31, 1933 |
| 2,363,762 | Wardan | Nov. 28, 1944 |
| 2,546,495 | Bybee | Mar. 27, 1951 |